United States Patent
McReynolds et al.

(10) Patent No.: US 6,252,745 B1
(45) Date of Patent: Jun. 26, 2001

(54) LATCH AND LINEAR CRASH STOP FOR A DISC DRIVE ACTUATOR ARM

(75) Inventors: Dave Paul McReynolds, Loveland; George Inslee Brent, Boulder; Gary F. Kelsic, Longmont; Richard Wayne Deichert, Broomfield; Aaron Steve Macpherson, Fort Collins, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/351,692

(22) Filed: Jul. 13, 1999

Related U.S. Application Data

(60) Provisional application No. 60/092,761, filed on Jul. 13, 1998.

(51) Int. Cl.[7] .................................................. G11B 5/55
(52) U.S. Cl. ................................................... 360/265.1
(58) Field of Search ............................... 360/256, 265.1, 360/256.2

(56) References Cited

U.S. PATENT DOCUMENTS

| | | | |
|---|---|---|---|
| 4,965,684 | 10/1990 | Stefansky | 360/78.12 |
| 5,023,736 | 6/1991 | Kelsic et al. | 360/105 |
| 5,025,335 | 6/1991 | Stefansky | 360/97.01 |
| 5,025,336 | 6/1991 | Morehouse et al. | 360/97.02 |
| 5,170,300 | 12/1992 | Stefansky | 360/105 |
| 5,187,627 | 2/1993 | Hickox et al. | 360/105 |
| 5,224,000 | 6/1993 | Casey et al. | 360/105 |
| 5,313,354 | 5/1994 | Sampietro et al. | 360/105 |
| 5,319,511 | 6/1994 | Lin | 360/105 |
| 5,329,412 | 7/1994 | Stefansky | 360/97.01 |
| 5,483,399 | 1/1996 | Jeong et al. | 360/105 |
| 5,568,333 | 10/1996 | Bang | 360/105 |
| 5,815,350 | 9/1998 | Kennedy et al. | 360/105 |
| 6,125,017 | * 9/2000 | Misso et al. | 360/265.1 |

FOREIGN PATENT DOCUMENTS 0 383 551   8/1990   (EP).

* cited by examiner

*Primary Examiner*—George J. Letscher
(74) *Attorney, Agent, or Firm*—John R. Wahl; Merchant & Gould P.C.

(57) ABSTRACT

A resilient linear latch and crash stop device incorporates a magnetic latch and a linear impact absorbing crash stop into a single composite body made up of a magnet member for contacting a strike plate on the actuator arm, an energy absorbing member, and a latch base body assembled together. The energy absorbing member fastens the magnet member to the base body and absorbs impact energy in a generally linear fashion throughout the range of anticipated impact magnitudes. The energy absorbing member is a generally rectangular elastomeric bellows member formed in place and sandwiched between the magnetic mounting plate and the base body. The elastomeric bellows member has a vertically open tubular passage therethrough that preferably has a bell shaped horizontal cross sectional shape.

19 Claims, 4 Drawing Sheets

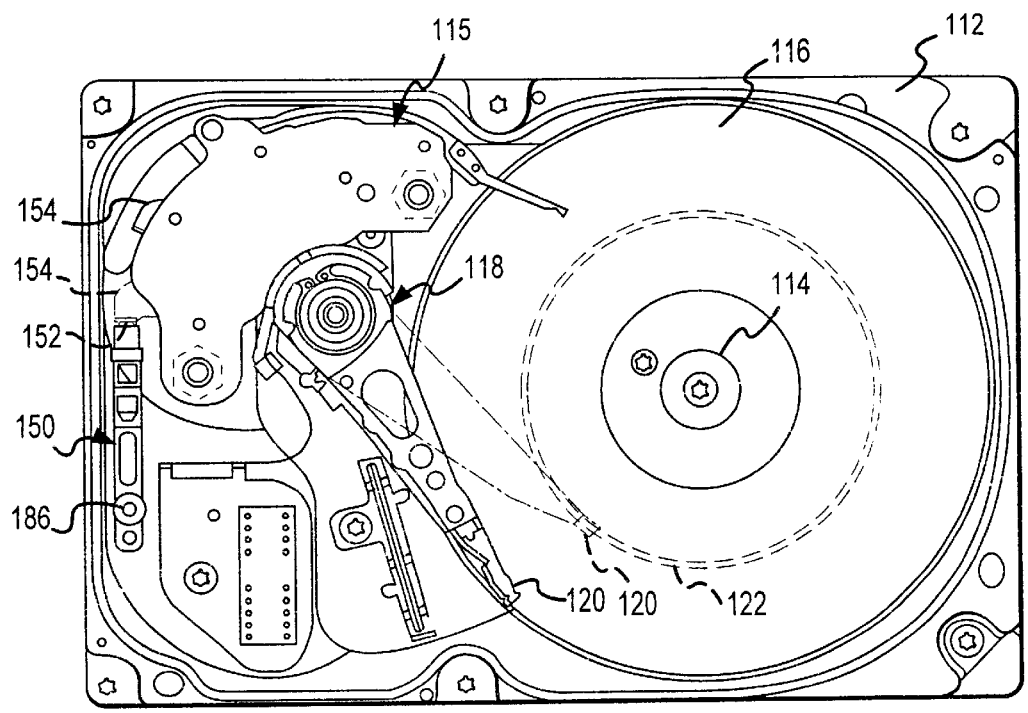
FIG.1
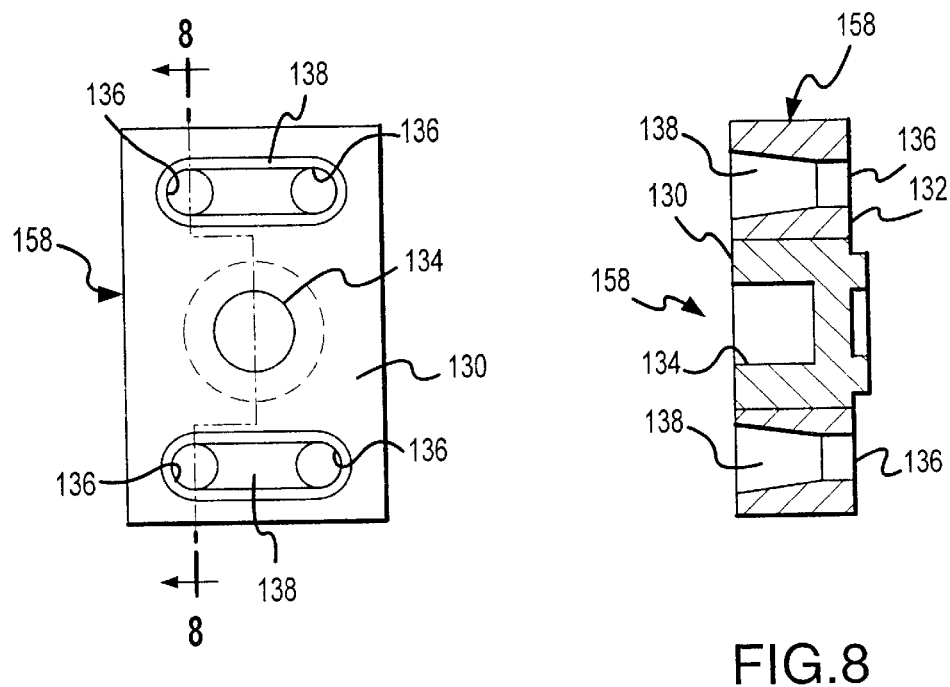
FIG.7
FIG.8

LATCH AND LINEAR CRASH STOP FOR A DISC DRIVE ACTUATOR ARM

RELATED APPLICATIONS

This application claims the benefit of priority of U.S. Provisional Patent Application Ser. No. 60/092,761, entitled "LINEAR LATCH, RUBBER BELLOWS", filed Jul. 13, 1998.

FIELD OF THE INVENTION

This application relates to magnetic disc drive assemblies and more particularly to an actuator arm crash stop/latch device.

BACKGROUND OF THE INVENTION

Various approaches have been developed to securely position an actuator arm assembly in a hard disc drive during a loss of power event or shutdown of the drive such that the heads land on and are retained on a portion of the disc real estate that does not contain data. Typically, these approaches involve either positioning the actuator arm onto a shelf to hold the heads away from the discs or positioning the heads over a portion of the disc surface that contains no data, such as the landing zones of the discs. The landing zone typically contains no magnetic recorded information or alternatively contains only historical servo information that is not pertinent to drive operation if damaged by the heads actually contacting the surface of the discs in this location. Approaches of holding the arm assembly in position include mechanical latches, electromechanical latches and magnetic latches. U.S. Pat. Nos. 5,568,333; 5,023,736; 5,483,399; 5,025,335 and 5,187,627 are representative of such latch devices.

To limit the range of motion of the actuator and heads under loss of power conditions and keep the heads in the landing zone, designers usually incorporate a crash stop with a latch mechanism to position and hold the arm in the park position while the drive is without power or actually turned off. One of the concerns in providing a resilient latch and crash stop device is the level of energy absorption by the latch device. It is desirable that the latch device absorb the impact of the actuator stopping without detrimentally affecting the head disc interface, even though the actuator arm is designed to stop in a position away from the data region of the discs where the heads are in a "park" position. If excessive impact were to occur, the heads or the disc surface itself could be damaged by head slap. Consequently crash stops may incorporate some type of rubber or elastomeric cushion and limit impact deflection so as to keep the heads from moving out of the landing zone onto the data region of the disc. Prior art stop designs incorporated little linear damping however, and sometimes the stop may deflect upward or downward from a direct impact line with the actuator tab (latching feature) because of its structural design and therefore may generate wear particles and/or generate undesirable resonances in the drive which can have undesirable effects on the head/disc interface in addition to resulting in excessive head movement.

SUMMARY OF THE INVENTION

Against this backdrop the present invention has been developed. The resilient linear latch and crash stop device in accordance with the present invention incorporates a magnetic latch and a linear impact absorbing crash stop into a single composite body made up of a magnet member for contacting a strike plate on the actuator arm, an energy absorbing member, and a latch base body assembled together wherein the energy absorbing member fastens the magnet member to the base body and absorbs impact energy in a generally linear fashion throughout the range of anticipated impact magnitudes. More particularly, the magnet member is fastened to a magnet support plate which is in turn fastened to the energy absorbing member. The energy absorbing member is an elastomeric body preferably formed in place and sandwiched between the magnetic mounting plate and the base body. The elastomeric body preferably has a vertically open, vertically symmetrical, tubular passage therethrough that preferably has a bell shaped horizontal cross sectional shape. The elastomeric body has a front end wall fastened to the magnet mounting plate, a rear end wall fastened to the base body, and a pair of spaced solid vertical side wall portions forming the vertical bell shaped tubular passage.

Each side wall portion has a thick side wall portion which provides directional stability to deflection of the magnet mounting plate during impact and a thin side wall portion preferably adjacent the front end wall which flexes to absorb the majority of impact forces of the actuator arm hitting the latch mechanism. After impact, the actuator arm is held fast with the strike plate against the domed head end of the latch magnet, until such time as the drive is again energized, and sufficient actuator arm motor force developed. The arm motor force must overcome the magnetic latching force and release the actuator for movement of the actuator arm and the read/write heads from the park position to the data portion of the rotating disc media.

The configuration of the elastomeric body having a vertical passage therethrough centered between the latch base body and the magnet mounting plate ensures that the impact forces received are linearly transmitted and absorbed. Consequently, there is minimal torsional distortion transmitted back into the actuator arm during deceleration and the result is a very cushioned and linear stopping of the actuator arm with the heads evenly decelerated to the park position. This results in minimal wear on the heads and disc surface at the park location and thus an increased longevity to the drive mechanism as a whole. These and various other features as well as advantages which characterize the present invention will be apparent from a reading of the following detailed description and a review of the associated drawings.

BRIEF DESCRIPTION OF THE DRAWINGS

FIG. 1 is a plan view of a hard disc drive apparatus incorporating an actuator latch in accordance with the present invention.

FIG. 7 is a separate front end view of the magnet mounting plate for the latch in accordance with the present invention.

FIG. 8 is a cross sectional view of the magnet mounting plate for the latch shown in FIG. 7 taken along the line 8—8 in FIG. 7.

DETAILED DESCRIPTION

Figure 2:
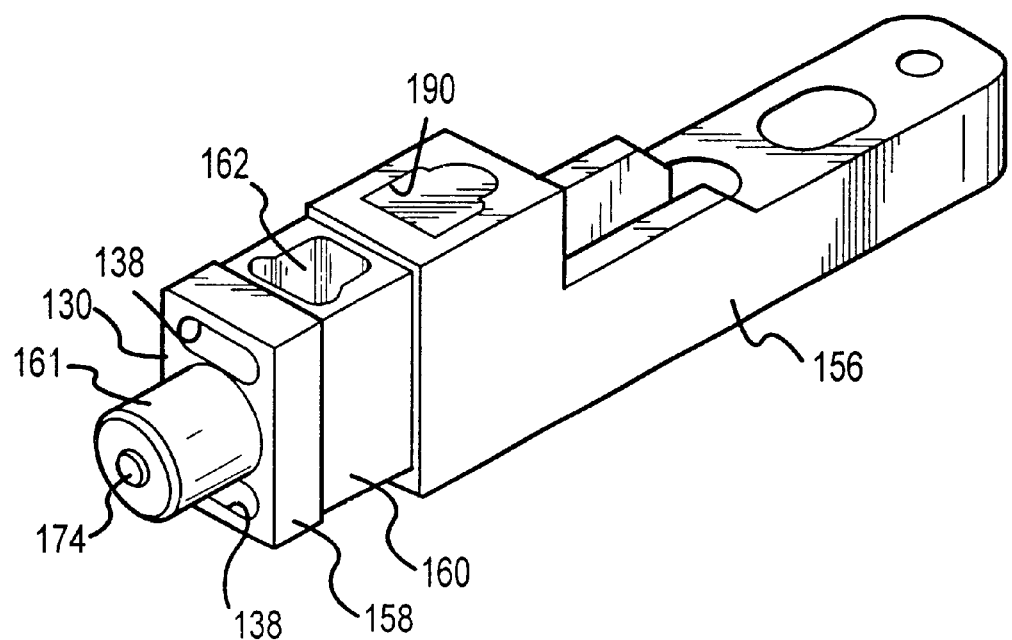
FIG. 2 is a perspective view of the actuator latch in accordance with one embodiment of the present invention.

A top view of a hard disc drive apparatus 110 incorporating an actuator latch and crash stop device 150 in accordance with the present invention is shown with the cover removed in FIG. 1. The hard disc drive apparatus 110 includes a housing base 112 to which is mounted a spindle motor 114 which carries and rotates one or more magnetic data discs 116. A voice coil motor (VCM) 115 is also mounted to the base housing 112. The VCM 115 is made up of a flat coil mounted between two coil mounting arms that are part of a pivotally mounted "Y" shaped actuator arm 118 which carries a plurality of load beam gimbal assemblies each of which supports a read/write head 120 above a surface of one of the discs 116. The actuator arm 118 is pivotally mounted to the housing base 112 for rotation of the actuator arm 118 so that the VCM can move the heads 120 in an arcuate path back and forth over the data portion or tracks defined between an inner radius and an outer radius of the disc surface.

The actuator arm 118 is shown in FIG. 1 in an exemplary position over an outer data track. Upon drive shutdown or loss of power, the actuator arm 118 is rotated, by design, automatically counterclockwise to a park position typically with the heads over a landing zone 122 which is a portion of the disc surfaces located adjacent the innermost data track. This zone is indicated by the dashed lines on the discs and the actuator arm position shown in phantom in FIG. 1. This landing zone 122 contains no data and therefore provides a resting place for the heads when the discs stop rotating and the heads come to rest against the surfaces of the discs 116.

The actuator latch and crash stop device 150 in accordance with the present invention is fastened to the housing base 112 in a position in cooperative engagement with a strike plate 152 on a tab 154 attached to the rear of the actuator arm 118. The strike plate 152 is made of a magnetically permeable material. When the actuator arm 118 is rotated to the park position, the strike plate 152 engages the device 150 to decelerate the actuator arm 118 and magnetically hold the actuator arm in place with the read/write heads in the landing zone 122.

Figure 4:
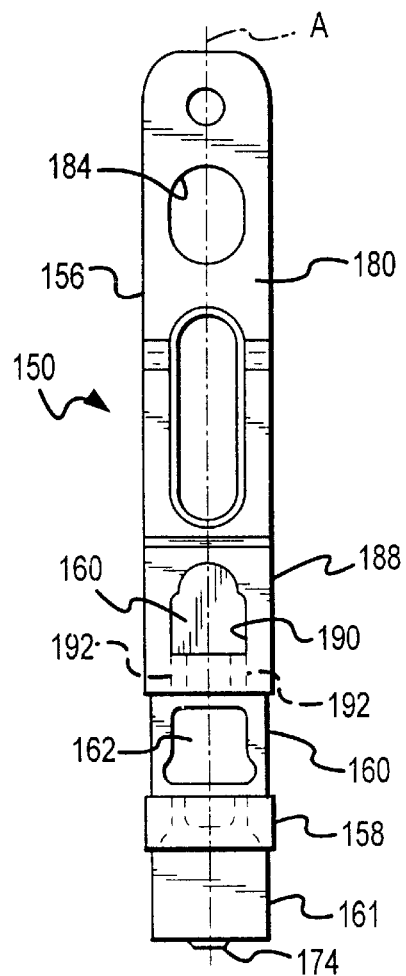
FIG. 4 is a plan or top view of the assembled latch in accordance with the invention shown in FIG. 2.
Figure 5:
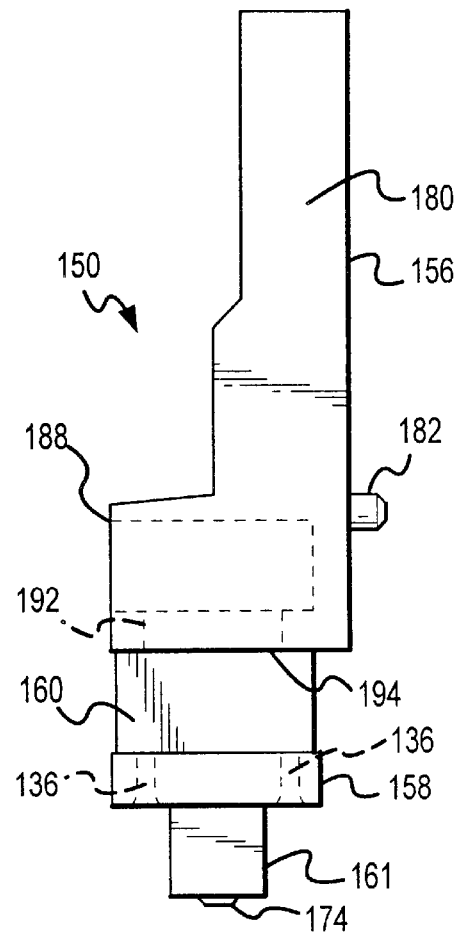
FIG. 5 is a side view of the assembled latch in accordance with the present invention.
Figure 6:
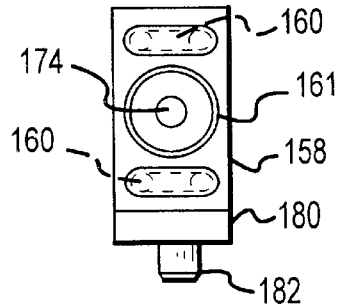
FIG. 6 is a front end view of the assembled latch in accordance with the present invention.

The actuator latch and crash stop device 150 is shown separately in a perspective view in FIG. 2 and in top, side and front end views in FIGS. 4, 5 and 6 respectively. The latch and crash stop device 150 has a base mounting member 156 and a magnet mounting plate 158 joined together by a resilient, elastomeric, energy absorber bellows member 160. A cylindrical magnet 161 is fastened to the magnet mounting plate 158 for cooperative engagement with the strike plate 152 on the tab 154 of the actuator arm 118 as above described when the actuator arm 118 rotates into the landing zone 122 position.

The energy absorbing bellows member 160 is a solid, generally rectangular elastomeric body formed in place and sandwiched between the magnetic mounting plate 158 and the base 156. The bellows member 160 supports the magnet mounting plate 158 which in turn supports the magnet 161. The base mounting member 156 is rigidly fastened to the base 112 of the hard disc drive 110 and supports the bellows member 160. The elastomeric bellows member 160 has a vertically open tubular passage 162 therethrough that has a vertically symmetrical cross-sectional shape and preferably has a bell shaped horizontal cross sectional shape. The elastomeric bellows member 160 has an externally visible generally rectangular box shape with a front end wall 164 fastened to the magnet mounting plate 158, a rear end wall 166 fastened to the base body, and a pair of spaced solid vertical side wall portions 168 together forming a resilient bellows and defining the vertical bell shaped tubular passage 162.

Each side wall portion 168 has a thick side wall portion 170 which provides directional stability to deflection of the magnet mounting plate 158 during initial impact with the actuator arm 118 and a thin side wall portion 172, preferably located adjacent the front end wall 164, which initially compresses, flexes and/or bows to absorb the majority of the impact force of the actuator arm 118 hitting the magnet 161 of the latch device 150. If the impact force exceeds the force necessary to deflect the thin portions 172, the thick wall portions 170 will compress and deflect to absorb and dampen the additional force of impact.

The uniform cross sectional thickness of the thin portion 172 vertically and the uniform cross sectional thickness of the thick wall portion 170 vertically combine to result in virtually all compression and deflection of the wall portions during impact being linear in the direction of the longitudinal axis A of the device 150 up to an anticipated impact loading of about 200 ips. After impact, the strike plate 152 on the actuator arm 118 is held against the dome shaped head 174 of the latch magnet 161 thus holding the heads in the landing zone 122 until such time as the drive is again energized. When the drive is again energized and there is sufficient actuator arm motor force developed to overcome the magnetic latching force, the actuator 118 is released for movement from the park position in the landing zone 122 to the data portion of the rotating disc media.

Referring now to FIGS. 4 and 5, the base mounting member 156 has an elongated, generally rectangular, mounting portion 180, preferably made of a rigid plastic material such as polyethylene sulfide, which has a flat bottom surface and a locating pin 182 projecting downward from the flat bottom surface. This locating pin 182 is sized and oriented to fit within an indexing hole (not shown) in the disc drive housing base 112. The mounting portion 180 also has a vertical elongated bore 184 therethrough for securing the base mounting member 156 to the housing 112 with a bolt 186, as is shown in FIG. 1.

The front end portion 188 of the base mounting member 156 has an enlarged generally rectangular box shape with a vertical aperture 190 extending downward into the end portion 188 joining a pair of elongated apertures 192 which open horizontally through the flat vertical front face 194 of the front end portion 188. The purpose of these apertures is to permit elastomer flow during the formation of the energy absorbing member bellows 160 and assembly of the device 150 as will be explained in further detail below.

The magnet mounting plate 158 is shown enlarged in a separate front and sectional view in FIGS. 7 and 8 respectively. The magnet mounting plate 158 is an injection molded plastic body preferably molded of, e.g., polyethylene sulfide, although other relatively rigid materials may alternatively be used. The magnet mounting plate 158 is a rectangular body with a flat front face 130 and flat rear face 132. The cylindrical magnet member 161 (not shown in FIGS. 7 and 8) is press fit or adhesively bonded into a central cylindrical blind bore 134 through the front face 130. The plate 158 also has two pairs of cylindrical bores extending from the rear face 132 toward the front face 130. One pair of bores 136 is arranged symmetrically above the blind bore 134 and one pair of bores 136 is symmetrically arranged below the blind bore 134. Each pair of bores 136 merges together into a single forwardly and outwardly flared elongated opening 138 through the front face 130 of the mounting plate 158.

The openings 138 and bores 136 in the magnet mounting plate 158 are filled with the elastomeric material forming integral portions of the front walls of the bellows member 160 (FIG. 2). Similarly the openings 190 and 192 (FIG. 4) in the front portion 188 of the base 156 are filled with the elastomeric material forming integral portions of the rear wall 166 of the bellows member 160. Thus the bellows member 160 is permanently interlocked with both the base 156 and the magnet support plate 158 to form a unitary latch and crash stop device which incorporates a bell shaped energy absorbing bellows to dampen resonant vibrations and excessive impact energy due to the deceleration of the actuator arm 118 when it impacts the latch magnet 161.

Figure 3:
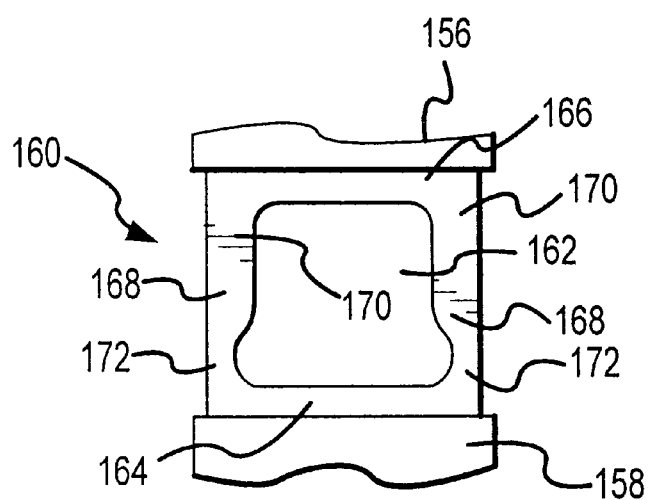
FIG. 3 is an enlarged plan view of the elastic shock absorbing portion of the latch shown in FIG. 2.

In general, the material, thickness and placement of the thin wall portion 172 (FIG. 3) of the bellows member 160 dictates the amount of spring force and damping that the bellows member 160 will typically exert against the actuator arm 118 upon impact. The latch device of the present invention thus provides a crash stop for controlled decelerations during normal drive shutdown and also prevents permanent drive damage during uncontrolled runaway event such as inadvertent power loss or actuator malfunctions.

Referring again to FIGS. 4–6, the bellows member 160 is formed of a natural or synthetic rubber material with good damping properties such as FLUOREL (Dupont) and has a durometer value in a range of 50 shore A to 80 shore A and preferably has a durometer value of about 60 shore A. The device 150 is formed by overmolding the bellows member 160 into both the front portion 188 of the mounting base 156 and the magnet mounting plate 158 so that the parts are locked together by the elastic bellows member 160. In essence, this involves placing the magnet mounting plate 158 in one portion of a mold cavity, placing the mounting base member 156 in another portion of the mold cavity, inserting a pin into the mold where the passage 162 is to be formed, and then closing the mold and injecting the elastomer to fill all the cavities in the mold and in the plate 158 and base member 156. The elastomer is then cured in the mold, the mold opened and pin removed, and the molded device is removed from the mold. Finally, the magnet 161 is press fit into the magnet mounting plate 158 to complete the assembly of the device 150.

Figure 9:
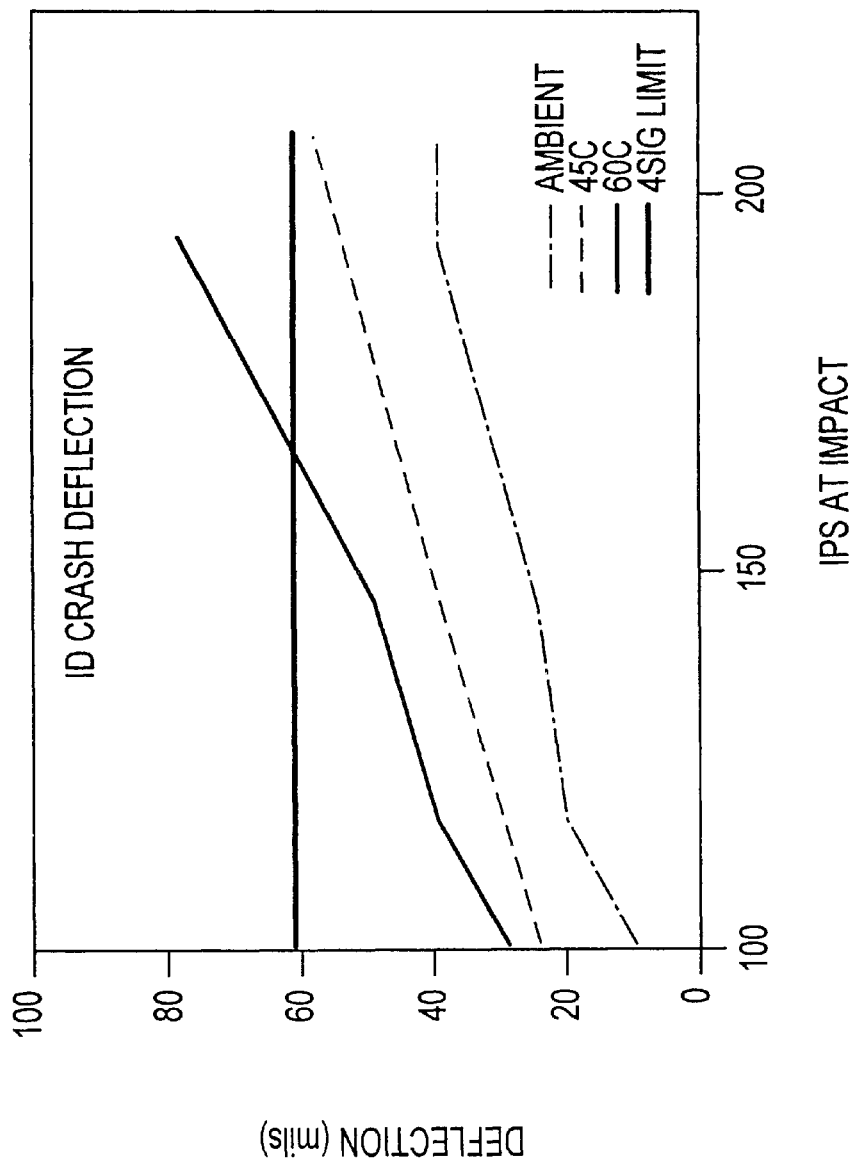
FIG. 9 is a graph of crash stop deflection versus impact force for a latch device in accordance with the present invention.

FIG. 9 is a graph of the latch deflection for an exemplary latch device constructed in accordance with this invention. The exemplary embodiment, reflected in FIG. 9, utilizes a bellows member 160 having, for example, a thin side wall thickness of about 0.5 millimeters, a thick side wall thickness of about 0.94 millimeters, and an overall bellows member width of about 4.4 millimeters. The height of the bellows member 160 is about 7.8 millimeters. The narrow width of the bell shaped tubular passage bore 162 is about 2.5 millimeters and the height of the passage 162 is about 3.1 millimeters. As can readily be seen from FIG. 9, the spring rate and thus the deflection of the actuator arm 118 and thus the heads 120 for the bellows member 160 is relatively uniform for normal impact forces between 0 and 200 ips (tangential velocity at the head). The deflection at normal operating temperatures of about 45 degrees C is quite linear with a deflection from 20 mils to 60 mils over a range of impact from 100 to 200 ips. This results in improved damping of vibration of the actuator arm 118 with less resultant wear on the magnet tip and strike plate as well as minimal wear of the heads 120. The amount of deflection and the spring rates may be varied by choice of bellows member materials and the location and thickness of the thin and thick wall portions and the overall dimensions of the bellows member 160.

An exemplary embodiment of the present invention is generally an actuator arm latch and crash stop device, for example, device (such as 150), which comprises a generally rigid base member (such as 156) mounted on a hard disc drive housing base plate (such as 112), a magnet mounting plate 158) supporting a magnet member (such as 161) thereon, and a resilient bellows member (such as 160) joined between and horizontally connecting the base member (such as 156) and the magnet mounting plate (such as 158) together, in which the bellows member (such as 160) has a generally rectangular outer shape and a vertically open passage (such as 162) therethrough. More particularly, the vertically open passage (such as 162) in the bellows member (such as 160) of the latch and crash stop device (such as 150) has a bell shaped horizontal cross section.

The latch and crash stop device (such as 150) preferably has a horizontal cross sectional shape which is uniform throughout the height of the bellows member (such as 160) between the mounting plate (such as 158) and the base (such as 156). Further, the bellows member (such as 160) in the latch and crash stop device (such as 150) is overmolded into a portion of the base 156) and into a portion of the magnet support plate (such as 158) to lock the plate and base together. The bellows member (such as 160) in the latch and crash stop device (such as 150) is preferably a solid rubber body, although other energy absorbing, resilient and preferably elastic materials may alternatively be used. Preferably the bellows member (such as 160) of the latch and crash stop device (such as 150) has a durometer in a range of 50 to 80 shore A.

Viewed another way, the invention is embodied as a hard disc drive assembly (such as 110) having at least one hard disc (such as 116) mounted on a spindle motor (such as 114) on a drive base plate (such as 112), with the disc (such as 116) containing a magnetic recording media on at least one surface thereof, a pivotally supported actuator arm (such as 118) mounted adjacent to the at least one disc (such as 116) on the base plate (such as 112), the actuator arm (such as 118) carrying a read/write head (such as 120) at one end thereof and a voice coil motor coil at an opposite end thereof, the opposite end having a tab (such as 154) thereon cooperatively engaging a latch and crash stop device (such as 150) when the actuator arm (such as 118) positions the head (such as 120) on a landing zone (such as 122) on the disc (such as 116), wherein the latch and crash stop device (such as 150) comprises a generally rigid base member 156 mounted on the hard disc drive housing base plate (such as 112), a magnet mounting plate (such as 158 supporting a magnet member (such as 161) thereon, and a resilient bellows member (such as 160) joined between and horizontally connecting the base member (such as 156) and the magnet mounting plate (such as 158) together.

The bellows (such as 160) member has a generally rectangular outer shape and a vertically open passage 162) therethrough. The magnet mounting plate (such as 158) has a magnet (such as 161) mounted thereto. The magnet mounting plate (such as 158) is preferably solely supported by the resilient bellows member (such as 160). The magnet mounting plate (such as 158) is a solid plastic body having a pair of flared apertures (such as 136, 138) therethrough receiving a portion of the resilient bellows member (such as 160) to lock the magnet mounting plate (such as 158) to the bellows member (such as 160). The base member (such as 156) preferably has at least one aperture (such as 190, 192) therein receiving a portion of the resilient bellows member (such as 160) therein to lock the resilient bellows member (such as 160) to the base (such as 156). The vertically open passage (such as 162) through the resilient bellows member (such as 160) preferably has a bell shaped horizontal cross sectional shape. In particular, the bellows member (such as 160) preferably has a front wall (such as 164), a back wall (such as 166) and a pair of spaced side walls (such as 168) defining the vertically open passage (such as 162) therethrough. Each of the side walls (such as (such as 168) has a thick portion (such as 170) and a thin portion (such as 172). The thin portion (such as 172) of the side wall (such as 168) is adjacent the front wall (such as 164 of the bellows member (such as 160).

An actuator arm latch and crash stop device (such as 150) is typically mounted on a hard disc drive base plate (such as 112). The device has a base member (such as 156) fastened to the base plate. The device (such as 150) has a magnet support plate (such as 158) supporting a magnet (such as 161) thereon and a resilient means (such as 160) between the magnet support plate (such as 158) and the base member (such as 156) for linearly deflecting to absorb energy upon impact by the actuator arm (such as 118) against the magnet (such as 161).

A latch and crash stop device (such as 150) in accordance with the present invention preferably has a support base member such as base member (such as 156), a magnet support plate (such as 158), and a resilient bellows member (such as 160) connecting the base member (such as 156) and the magnet support plate (such as 158) together. The bellows member (such as 160) preferably has a vertical tubular passage (such as 162) therethrough, a portion locking the base member (such as 156) to the bellows member (such as 160) and another portion locking the magnet support plate (such as 158) to the bellows member (such as 160). The bellows member (such as 160) has a front wall (such as 164), a back wall (such as 166 and a pair of spaced vertical side walls (such as 168 defining the vertical passage (such as 162 therethrough. Each of the side walls (such as 168) has a thick vertical portion (such as 170) and a thin vertical portion (such as 172) side by side in series. The bellows member (such as 160) is preferably made of a rubber material having a durometer between 50 shore A and 80 shore A. The walls (such as 164, 166, and 168) of the bellows member (such as 160) define the passage (such as 162) therebetween preferably having a vertically substantially symmetric cross sectional area.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. For example, the thin wall portion 172 may alternatively be positioned adjacent the rear wall or mid way between the front and end walls depending on the design impact forces anticipated. In addition, an additional thin wall portion may be provided to give a more accordion cross sectional shape to the resilient member bellows 160. Accordingly, all such modifications, changes and alternatives are encompassed in the spirit of the invention disclosed and as defined in the appended claims. All patents, patent applications, and other printed publications referred to herein are hereby incorporated by reference herein in their entirety.

What is claimed is:

1. An actuator arm latch and crash stop device comprising:
   a generally rigid base member mounted on a hard disc drive housing base plate;
   a magnet mounting plate supporting a magnet member thereon; and
   a resilient bellows member joined between and horizontally connecting the base member and the magnet mounting plate together, the bellows member having a generally rectangular outer shape and a front wall, a back wall and a pair of spaced vertical side walls defining a vertical open passage through the bellows member, wherein each of the side walls has a thick portion and a thin portion in series between the front and back walls.

2. The latch and crash stop device according to claim 1 wherein the vertically open passage in the bellows member has a bell shaped horizontal cross section.

3. The latch and crash stop device according to claim 2 wherein the horizontal cross sectional shape is uniform throughout the height of the bellows member.

4. The latch and crash stop device according to claim 3 wherein the bellows member is overmolded into a portion of the base and into a portion of the magnet support plate to lock the plate and base together.

5. The latch and crash stop device according to claim 4 wherein the bellows member is composed entirely of rubber.

6. The latch and crash stop device according to claim 5 wherein the bellows member has a durometer between about 50 shore A to 80 shore A.

7. A hard disc drive assembly having at least one hard disc mounted on a spindle motor on a drive base plate, the disc containing a magnetic recording media on at least one surface of the disc, a pivotally supported actuator arm mounted adjacent the at least one disc on the base plate, the actuator arm carrying a read/write head at one end of the actuator arm and a voice coil motor coil at an opposite end of the actuator arm, the opposite end having a tab thereon cooperatively engaging a latch and crash stop device when the actuator arm positions the head on a landing zone on the disc, the latch and crash stop device comprising:
   a generally rigid base member mounted on the hard disc drive housing base plate;
   a magnet mounting plate supporting a magnet member thereon; and
   a resilient bellows member joined between and horizontally connecting the base member and the magnet mounting plate together, the bellows member having a generally rectangular outer shape and a vertically open passage therethrough, the vertically open passage having a bell shaped horizontal cross section.

8. The hard disc drive assembly according to claim 7 wherein the magnet mounting plate has a magnet mounted thereto.

9. The assembly according to claim 8 wherein the magnet mounting plate is solely supported by the resilient bellows member.

10. The assembly according to claim 7 wherein the magnet mounting plate is a solid plastic body having a pair of flared apertures therethrough receiving a portion of the resilient bellows member to lock the magnet mounting plate to the bellows member.

11. The assembly according to claim 10 wherein the base member has at least one aperture therein receiving a portion of the resilient bellows member therein to lock the resilient bellows member to the base.

12. The assembly according to claim 7 wherein the bellows member has a front wall, a back wall and a pair of spaced side walls defining the vertically open passage therethrough.

13. The assembly according to claim 12 wherein each side wall has a thick portion and a thin portion.

14. The assembly according to claim 13 wherein the thin portion of the side wall is adjacent the front wall of the bellows member.

15. An actuator arm latch and crash stop device mounted on a hard disc drive base plate, the device having a base member fastened to the base plate, the device comprising:
   a magnet support plate having a front surface, the magnetic support plate defining a bore;
   a magnet fixedly attached to the front face of the magnet support plate; and
   a bellows member positioned between the magnet support plate and the base member for linearly deflecting to absorb energy upon impact by the actuator arm against the magnet, a portion of the bellows member extending into the bore so as to couple the magnetic support plate to the bellows member.

16. The device according to claim 15 wherein the bellows member has a vertical tubular passage therethrough and a portion locking the base member to the bellows member.

17. The device according to claim 16 wherein the bellows member has a front wall, a back wall and a pair of spaced vertical side walls defining the vertical passage therethrough.

18. The device according to claim 17 wherein each of the side walls has a thick vertical portion and a thin vertical portion in series.

19. The device according to claim 18 wherein the walls of the bellows member define the passage therebetween having a vertically substantially symmetrical cross sectional area.

* * * * *